(12) United States Patent
Cooper (10) Patent No.: US 10,408,323 B2
(45) Date of Patent: Sep. 10, 2019

(54) DRIVE UNIT WITH TWIN SIDE SHAFT TORQUE COUPLING

(71) Applicant: Dana Automotive Systems Group, LLC, Maumee, OH (US)

(72) Inventor: Kenneth E. Cooper, Toledo, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 279 days.

(21) Appl. No.: 15/326,380

(22) PCT Filed: Jul. 15, 2015

(86) PCT No.: PCT/US2015/040474
§ 371 (c)(1),
(2) Date: Jan. 13, 2017

(87) PCT Pub. No.: WO2016/011096
PCT Pub. Date: Jan. 21, 2016

(65) Prior Publication Data
US 2017/0211675 A1    Jul. 27, 2017

Related U.S. Application Data

(60) Provisional application No. 62/025,297, filed on Jul. 16, 2014.

(51) Int. Cl.
*F16H 48/19* (2012.01)
*F16D 13/54* (2006.01)
(Continued)

(52) U.S. Cl.
CPC ............. *F16H 48/19* (2013.01); *F16D 13/54* (2013.01); *F16D 21/00* (2013.01); *F16D 23/12* (2013.01);
(Continued)

(58) Field of Classification Search
CPC .......... F16H 48/19; F16H 48/22; F16H 48/36; F16D 13/54; F16D 21/00; F16D 23/12; F16D 28/00; F16D 2023/123
See application file for complete search history.

(56) References Cited

U.S. PATENT DOCUMENTS 2,913,929 A    11/1959    Anderson
3,063,529 A    11/1962    Cook
(Continued)

FOREIGN PATENT DOCUMENTS

DE          3801351 A1     8/1989
DE     102011010597 A1     2/2012
(Continued)

OTHER PUBLICATIONS

International Search Report and Written Opinion for Application No. PCT/US2015/040474, dated Nov. 5, 2015, issued by the European Patent Office.
(Continued)

*Primary Examiner* — Zakaria Elahmadi
(74) *Attorney, Agent, or Firm* — Marshall & Melhorn, LLC (57) ABSTRACT

A drive unit with twin side shaft torque coupling has an intermediate shaft with a first end portion and a second end portion and a central portion with a ring gear. A first clutch drum is directly mounted on the first end portion of the intermediate shaft. The first clutch drum has a first plurality of clutch plates. A first clutch can is located radially inboard of the first clutch drum. The first clutch can supports selective axial movement of a second plurality of clutch plates. The first and second plates are interleaved with one another to form a clutch pack. The first clutch can is connected to one end portion of a first output shaft located radially inboard from said first clutch can. A first clutch actuator assembly selectively actuates the first clutch. The
(Continued)

drive unit also comprises a second clutch drum, clutch can and clutch actuator assembly.

16 Claims, 1 Drawing Sheet

(51) Int. Cl.
*F16D 28/00* (2006.01)
*F16H 48/22* (2006.01)
*F16H 48/36* (2012.01)
*F16D 21/00* (2006.01)
*F16D 23/12* (2006.01)

(52) U.S. Cl.
CPC ............. *F16D 28/00* (2013.01); *F16H 48/22* (2013.01); *F16H 48/36* (2013.01); *F16D 2023/123* (2013.01)

(56) References Cited

U.S. PATENT DOCUMENTS

| | | |
|---|---|---|
| 3,161,270 A | 12/1964 | Aschauer |
| 3,592,304 A | 7/1971 | Thompson |
| 3,680,409 A | 8/1972 | Chamberlain |
| 4,157,750 A | 6/1979 | Horsch |
| 4,263,824 A | 4/1981 | Mueller |
| 4,271,722 A | 6/1981 | Campbell |
| 4,526,063 A | 7/1985 | Oster |
| RE31,981 E | 9/1985 | Lindbert |
| 4,625,584 A | 12/1986 | Onodera |
| 4,712,448 A | 12/1987 | Lanzer |
| 4,718,303 A | 1/1988 | Fogelberg |
| 4,782,720 A | 11/1988 | Teraoka et al. |
| 4,805,486 A | 2/1989 | Hagiwara et al. |
| 4,895,236 A | 1/1990 | Sakakibara et al. |
| 4,898,431 A | 2/1990 | Karnopp et al. |
| 4,907,685 A | 3/1990 | Landolt |
| 4,921,065 A | 5/1990 | Hamada et al. |
| 4,950,214 A | 8/1990 | Botterill |
| 4,955,853 A | 9/1990 | Bausch |
| 4,976,347 A * | 12/1990 | Sakakibara ........ B60K 17/3462 180/249 |
| 4,998,593 A | 3/1991 | Karnopp et al. |
| 5,019,021 A | 5/1991 | Janson |
| 5,033,329 A | 7/1991 | Tezuka |
| 5,080,640 A | 1/1992 | Botterill |
| 5,086,867 A | 2/1992 | Hirota et al. |
| 5,092,825 A | 3/1992 | Goscenski, Jr. et al. |
| 5,098,360 A | 3/1992 | Hirota |
| 5,105,901 A | 4/1992 | Watanabe et al. |
| 5,106,349 A | 4/1992 | Botterill et al. |
| 5,119,900 A | 6/1992 | Watanabe et al. |
| 5,135,071 A | 8/1992 | Shibahata et al. |
| 5,136,507 A | 8/1992 | Shiraishi et al. |
| 5,172,787 A | 12/1992 | Kobayashi |
| 5,261,503 A | 11/1993 | Yasui |
| 5,279,401 A | 1/1994 | Stall |
| 5,299,986 A | 4/1994 | Fabris et al. |
| 5,415,598 A | 5/1995 | Sawase et al. |
| 5,417,298 A | 5/1995 | Shibahata |
| 5,450,919 A | 9/1995 | Shitani |
| 5,456,641 A | 10/1995 | Sawase |
| 5,483,446 A | 1/1996 | Momose et al. |
| 5,531,653 A | 7/1996 | Barholt |
| 5,577,588 A | 11/1996 | Raszkowski |
| 5,671,982 A | 9/1997 | Wanke |
| 5,690,002 A | 11/1997 | Showalter |
| 5,699,888 A | 12/1997 | Showalter |
| 5,732,379 A | 3/1998 | Eckert et al. |
| 5,762,406 A | 6/1998 | Yasui et al. |
| 5,791,447 A | 8/1998 | Lamela et al. |
| 5,810,142 A | 9/1998 | Schaefer |
| 5,839,328 A | 11/1998 | Showalter |
| 5,845,546 A | 12/1998 | Knowles et al. |
| 5,850,616 A | 12/1998 | Matsuno et al. |
| 5,884,738 A | 3/1999 | Joslin et al. |
| 5,910,064 A | 6/1999 | Kuroki |
| 5,911,291 A | 6/1999 | Suetake et al. |
| 5,911,643 A | 6/1999 | Godlew et al. |
| 5,921,889 A | 7/1999 | Nozaki et al. |
| 5,941,334 A | 8/1999 | Inagaki |
| 5,964,126 A | 10/1999 | Okcuoglu |
| 5,966,999 A | 10/1999 | Showalter et al. |
| 6,063,000 A | 5/2000 | Sugimoto |
| 6,064,930 A | 5/2000 | Shibahata |
| 6,070,495 A | 6/2000 | Kuroda et al. |
| 6,079,535 A | 6/2000 | Mueller et al. |
| 6,094,614 A | 7/2000 | Hiwatashi |
| 6,095,276 A | 8/2000 | Kuroda et al. |
| 6,098,770 A | 8/2000 | Isley, Jr. |
| 6,105,703 A | 8/2000 | Kuroda et al. |
| 6,189,669 B1 | 2/2001 | Kremer et al. |
| 6,244,407 B1 | 6/2001 | Kremer et al. |
| 6,293,890 B1 * | 9/2001 | Kaku .................... F16H 48/08 188/71.5 |
| 6,308,812 B1 | 10/2001 | Eike et al. |
| 6,327,935 B1 | 12/2001 | Joslin et al. |
| 6,349,809 B1 | 2/2002 | Isley, Jr. |
| 6,378,677 B1 | 4/2002 | Kuroda et al. |
| 6,393,351 B2 | 5/2002 | Frediani et al. |
| 6,398,686 B1 | 6/2002 | Irwin |
| 6,427,102 B1 | 7/2002 | Ding |
| 6,432,021 B1 | 8/2002 | Averill |
| 6,442,469 B1 | 8/2002 | Matsuno |
| 6,460,674 B1 | 10/2002 | Clay |
| 6,460,677 B1 | 10/2002 | Roscoe |
| 6,478,708 B2 | 11/2002 | Krisher |
| 6,493,624 B2 | 12/2002 | Nishida et al. |
| 6,497,301 B2 | 12/2002 | Iida et al. |
| 6,517,462 B2 | 2/2003 | Borgan et al. |
| 6,533,090 B2 | 3/2003 | Osborn et al. |
| 6,533,699 B1 | 3/2003 | Felt |
| 6,537,172 B1 | 3/2003 | McAuliffe, Jr. et al. |
| 6,561,939 B1 | 5/2003 | Knapke |
| 6,564,134 B2 | 5/2003 | Nishida et al. |
| 6,564,140 B2 | 5/2003 | Ichikawa et al. |
| 6,571,928 B1 | 6/2003 | Gassmann |
| 6,582,336 B2 | 6/2003 | Forrest et al. |
| 6,604,596 B2 | 8/2003 | Bracke et al. |
| 6,631,779 B2 | 10/2003 | Watson et al. |
| 6,654,674 B2 | 11/2003 | Lu et al. |
| 6,711,968 B2 | 3/2004 | Krzesicki et al. |
| 6,719,662 B2 | 4/2004 | Forrest et al. |
| 6,742,640 B1 | 6/2004 | Grogg et al. |
| 6,742,642 B1 | 6/2004 | Stevenson et al. |
| 6,755,763 B1 | 6/2004 | Goto et al. |
| 6,766,889 B1 | 7/2004 | Pennycuff |
| 6,779,420 B2 | 8/2004 | Peura |
| 6,790,154 B1 | 9/2004 | Kelley, Jr. |
| 6,805,653 B2 | 10/2004 | Krzesicki et al. |
| 6,808,037 B1 | 10/2004 | Mueller |
| 6,808,052 B2 | 10/2004 | Kirkwood et al. |
| 6,817,434 B1 | 11/2004 | Sweet |
| 6,830,122 B2 | 12/2004 | Kroppe |
| 6,840,363 B2 | 1/2005 | Braford, Jr. et al. |
| 6,885,931 B2 | 4/2005 | Anwar |
| 6,905,008 B2 | 6/2005 | Kowalsky et al. |
| 6,938,748 B2 | 9/2005 | Pennycuff |
| 6,945,374 B2 | 9/2005 | Puiu |
| 6,945,375 B2 | 9/2005 | Kirkwood et al. |
| 6,948,604 B2 | 9/2005 | Puiu |
| 6,959,799 B2 | 11/2005 | Fusegi et al. |
| 6,962,227 B1 | 11/2005 | Kirkwood |
| 6,963,797 B2 | 11/2005 | Salib et al. |
| 6,971,494 B2 | 12/2005 | Puiu |
| 6,991,079 B2 | 1/2006 | Puiu |
| 6,991,080 B2 | 1/2006 | Puiu |
| 6,997,299 B2 | 2/2006 | Brissenden et al. |
| 7,001,303 B1 | 2/2006 | Peura |
| 7,004,870 B2 | 2/2006 | Kroppe |
| 7,004,873 B2 | 2/2006 | Puiu |
| 7,007,763 B2 | 3/2006 | Ginther et al. |
| 7,021,445 B2 | 4/2006 | Brissenden et al. |

(56) References Cited

U.S. PATENT DOCUMENTS

| | | |
|---|---|---|
| 7,037,231 B2 | 5/2006 | Showalter |
| 7,044,880 B2 | 5/2006 | Bowen |
| 7,059,462 B2 | 6/2006 | Brissenden et al. |
| 7,059,992 B1 | 6/2006 | Bowen |
| 7,080,707 B2 | 7/2006 | Kirkwood |
| 7,083,172 B2 | 8/2006 | Kou |
| 7,083,541 B2 | 8/2006 | Pecnik et al. |
| 7,111,702 B2 | 9/2006 | Perlick et al. |
| 7,111,716 B2 | 9/2006 | Ekonen et al. |
| 7,125,357 B2 | 10/2006 | Porter |
| 7,132,937 B2 | 11/2006 | Lu et al. |
| 7,175,557 B2 | 2/2007 | Kirkwood et al. |
| 7,201,264 B2 | 4/2007 | Puiu |
| 7,201,266 B2 | 4/2007 | Brissenden et al. |
| 7,239,949 B2 | 7/2007 | Lu et al. |
| 7,258,213 B2 | 8/2007 | Ekonen et al. |
| 7,267,628 B2 | 9/2007 | Bowen |
| 7,278,943 B2 | 10/2007 | Puiu |
| 7,294,086 B2 | 11/2007 | Brissenden et al. |
| 7,300,385 B2 | 11/2007 | Cherry et al. |
| 7,316,304 B2 | 1/2008 | Heravi et al. |
| 7,337,886 B2 | 3/2008 | Puiu |
| 7,338,403 B2 | 3/2008 | Puiu |
| 7,344,469 B2 | 3/2008 | Sharma et al. |
| 7,357,748 B2 | 4/2008 | Kelley, Jr. |
| 7,390,278 B2 | 6/2008 | Krisher |
| 7,445,581 B2 | 11/2008 | Cring |
| 7,452,299 B2 | 11/2008 | Teraoka |
| 7,455,135 B2 | 11/2008 | Janson et al. |
| 7,458,437 B2 | 12/2008 | Davidsson |
| 7,491,146 B2 | 2/2009 | Sharma et al. |
| 7,497,311 B2 | 3/2009 | Knowles |
| 7,503,416 B2 | 3/2009 | Sharma et al. |
| 7,506,740 B2 | 3/2009 | Ronk et al. |
| 7,510,041 B2 | 3/2009 | Bowen |
| 7,527,133 B2 | 5/2009 | Sachsenmaier et al. |
| 7,530,421 B2 | 5/2009 | Mori et al. |
| 7,533,754 B2 | 5/2009 | Burrows et al. |
| 7,584,832 B2 | 9/2009 | Baasch et al. |
| 7,610,980 B2 | 11/2009 | Mori |
| 7,686,149 B2 | 3/2010 | Sachsenmaier et al. |
| 7,694,794 B2 | 4/2010 | Biles et al. |
| 7,699,740 B2 | 4/2010 | Gassmann et al. |
| 7,811,194 B2 * | 10/2010 | Bowen ............... B60K 17/3467 475/201 |
| 7,846,056 B2 | 12/2010 | Chludek et al. |
| 7,887,450 B2 | 2/2011 | Fusegi et al. |
| 8,025,137 B2 | 9/2011 | Sasaki et al. |
| 8,042,642 B2 | 10/2011 | Marsh et al. |
| 8,047,323 B2 | 11/2011 | Downs et al. |
| 8,215,440 B2 | 7/2012 | Hoffmann et al. |
| 8,231,493 B2 | 7/2012 | Radzevich |
| 8,256,593 B2 * | 9/2012 | Kato ............... F16D 25/02 192/35 |
| 8,308,598 B2 | 11/2012 | Pritchard et al. |
| 8,313,407 B2 | 11/2012 | Ekonen et al. |
| 8,348,799 B2 | 1/2013 | Maruyama et al. |
| 8,388,486 B2 | 3/2013 | Ekonen et al. |
| 8,469,854 B1 * | 6/2013 | Downs ............... B60K 23/08 475/221 |
| 8,474,349 B2 | 7/2013 | Grogg et al. |
| 8,506,441 B2 | 8/2013 | Hultgren |
| 8,534,409 B2 | 9/2013 | Sigmund et al. |
| 8,584,785 B2 | 11/2013 | Marsh et al. |
| 8,584,786 B2 | 11/2013 | Grogg |
| 8,584,823 B2 | 11/2013 | Phillips et al. |
| 8,597,150 B1 | 12/2013 | Downs et al. |
| 8,720,633 B2 * | 5/2014 | Grutter ............... B60K 17/344 180/233 |
| 8,905,212 B2 | 12/2014 | Vierk et al. |
| 2002/0077212 A1 | 6/2002 | Krisher |
| 2003/0171182 A1 | 9/2003 | Peura |
| 2005/0261101 A1 | 11/2005 | Yoshioka |
| 2005/0266952 A1 * | 12/2005 | Puiu ............... B60K 17/3462 475/205 |
| 2006/0011441 A1 * | 1/2006 | Showalter ............... B60K 17/3467 192/84.6 |
| 2006/0014601 A1 | 1/2006 | Kelley, Jr. |
| 2006/0032722 A1 | 2/2006 | Guinter et al. |
| 2006/0163018 A1 * | 7/2006 | Ekonen ............... B60K 23/0808 192/35 |
| 2007/0095628 A1 * | 5/2007 | Niederbacher .... B60K 17/3462 192/84.6 |
| 2007/0282512 A1 | 12/2007 | Hoeck et al. |
| 2008/0210508 A1 | 9/2008 | Heisey et al. |
| 2010/0038164 A1 | 2/2010 | Downs et al. |
| 2010/0094519 A1 | 4/2010 | Quehenberger et al. |
| 2011/0039652 A1 | 2/2011 | Ekonen et al. |
| 2011/0143878 A1 | 6/2011 | Juenemann et al. |
| 2011/0179906 A1 | 7/2011 | Juenemann et al. |
| 2011/0308875 A1 | 12/2011 | Marsh et al. |
| 2011/0319213 A1 | 12/2011 | Ekonen et al. |
| 2012/0021864 A1 | 1/2012 | Ziech et al. |
| 2012/0238388 A1 | 9/2012 | Fusegi et al. |
| 2012/0252625 A1 | 10/2012 | Crasset |
| 2013/0178321 A1 | 7/2013 | Ekonen et al. |
| 2013/0178323 A1 | 7/2013 | Ekonen et al. |
| 2013/0190126 A1 * | 7/2013 | Braford, Jr. ............... F16H 48/22 475/231 |
| 2013/0260959 A1 | 10/2013 | Quehenberger et al. |
| 2014/0124320 A1 | 5/2014 | Cooper |
| 2014/0284163 A1 * | 9/2014 | Yamamoto ............... F16D 23/12 192/66.3 |
| 2014/0309007 A1 | 10/2014 | Schimpf et al. |
| 2014/0371020 A1 * | 12/2014 | Cooper ............... F16H 48/20 475/220 |
| 2015/0144453 A1 * | 5/2015 | Larkin ............... F16D 27/14 192/84.7 |
| 2016/0039284 A1 * | 2/2016 | Osborn ............... B60K 17/35 180/245 |
| 2016/0193915 A1 * | 7/2016 | Cooper ............... B60K 17/348 475/220 |

FOREIGN PATENT DOCUMENTS

| | | |
|---|---|---|
| DE | 102012216709 A1 | 3/2014 |
| DE | 102012216710 A1 | 3/2014 |
| EP | 0193383 A1 | 9/1986 |
| GB | 2216077 A | 10/1989 |
| JP | S58209624 A | 12/1983 |
| JP | H034055 A | 1/1991 |
| JP | H03070633 A | 3/1991 |
| JP | H04143129 A | 5/1992 |
| JP | H05185859 A | 7/1993 |
| JP | H06099758 A | 4/1994 |
| JP | H06270708 A | 9/1994 |
| JP | 2800945 B2 | 9/1998 |
| JP | 2002370557 A | 12/2002 |
| JP | 2004068878 A | 3/2004 |
| JP | 2010260383 A | 11/2010 |
| WO | 8602981 A1 | 5/1986 |
| WO | 2007002736 A2 | 1/2007 |

OTHER PUBLICATIONS

European Patent Office, European Search Report with written opinion issued in Application 18152557.7, dated Oct. 5, 2018, 8 pages, European Patent Office, Munich, Germany.

* cited by examiner

DRIVE UNIT WITH TWIN SIDE SHAFT TORQUE COUPLING

RELATED APPLICATIONS

This application claims the benefit of and priority to U.S. provisional patent application Ser. No. 62/025,297 filed on Jul. 16, 2014, which is incorporated by reference herein.

FIELD OF THE DISCLOSURE

The present disclosure relates to differentials and associated torque coupling units for a motor vehicle. For example, the present disclosure can relate to a rear wheel drive unit having a twin side shaft torque coupling. Further, the present disclosure can relate to a hybrid electric, or an all electric, vehicle where the front wheels provide primary drive and the rear wheels provide secondary drive. In any of these cases, the disclosure can relate to vehicles that do not have a direct mechanical connection between the front and rear wheels.

BACKGROUND OF THE DISCLOSURE

All-wheel drive vehicles may have a primary full time driveline and a secondary part-time driveline, where the secondary driveline provides additional traction under vehicle acceleration or poor traction conditions. A torque coupling may be used in the secondary driveline to limit the torque flow from the primary driveline and to allow for differences in speed between the primary and secondary drivelines. When the secondary driveline is not providing additional traction it continues to rotate and energy is lost overcoming friction and spin loss (oil churning), both of which act to reduce fuel economy. To improve fuel economy, it is desirable to automatically disconnect the secondary driveline to eliminate energy losses.

It would be advantageous to develop a rear wheel drive unit having a twin side shaft torque coupling which may be selectively engaged to increase an efficiency of and to provide additional traction to a driveline where the rear wheel drive unit is incorporated.

SUMMARY OF THE DISCLOSURE

A drive unit with twin side shaft torque coupling has an intermediate shaft with a first end portion and a second end portion and a central portion with a ring gear. A first clutch drum is directly mounted on the first end portion of the intermediate shaft. The first clutch drum has a first plurality of clutch plates. A first clutch can is located radially inboard of the first clutch drum. The first clutch can has a second plurality of clutch plates. The first and second plates are interleaved with one another to form a clutch pack. The first clutch can is connected to one end portion of a first output shaft located radially inboard from said first clutch can. A first clutch actuator assembly selectively actuates the first clutch. The drive unit also comprises a second clutch drum, clutch can and clutch actuator assembly.

A method of coupling torque through the twin side shafts includes providing an idle mode wherein the two clutch drums, the intermediate shaft connected to both clutch drums, a ring gear connected to the intermediate shaft and a pinion gear are disconnected from the output shafts. An engaged mode is also provided wherein the two clutch drums, the intermediate shaft, the ring gear and the pinion gear provide drive to the output shafts.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION OF THE DISCLOSURE

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts of the present invention. Hence, specific dimensions, directions, orientations or other physical characteristics relating to the embodiments disclosed are not to be considered as limiting, unless expressly stated otherwise.

The present disclosure relates to differentials and associated torque coupling units for a motor vehicle. For example, the disclosure can relate to a rear wheel drive unit having a twin side shaft torque coupling. Further, the disclosure can relate to a hybrid electric, or an all electric vehicle, where the front wheels provide primary drive and the rear wheels provide secondary drive via the mechanism described herein. In any of these cases, the present disclosure can relate to vehicles that do not have a direct mechanical connection between the front and rear wheels. The vehicles may be such as primary fossil fuel driven vehicles, hybrid driven vehicles and/or electric vehicles.

Figure 1:
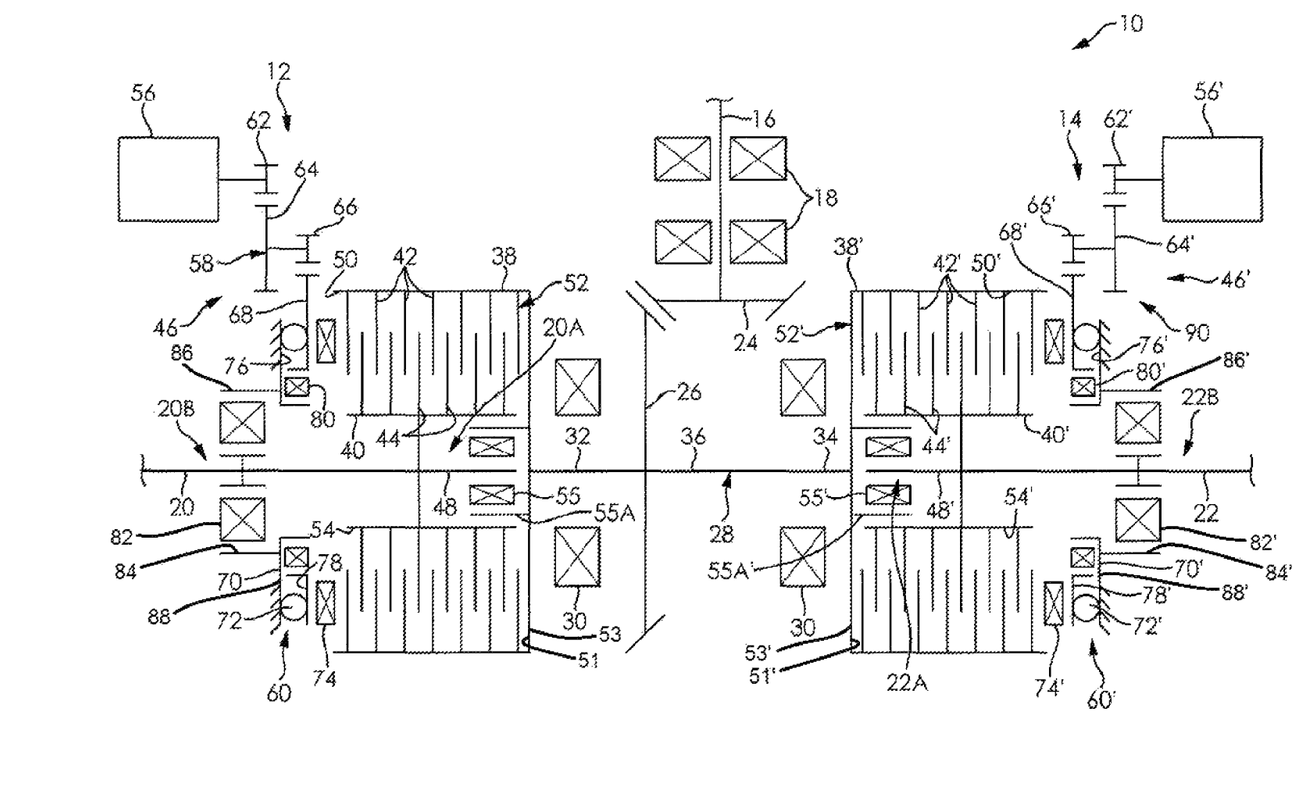
FIG. 1 is a schematic view of a rear wheel drive unit having a twin side shaft coupling according to an embodiment of the disclosure.

FIG. 1 illustrates a rear wheel drive unit 10 having a first side shaft torque coupling 12 and a second side shaft torque coupling 14. The rear wheel drive unit 10 is in driving engagement with a pinion shaft 16. The pinion shaft 16 is rotatably mounted in bearings 18 and is drivingly engaged with a source of rotational power, such as, but not limited to, an internal combustion engine. The pinion shaft 16 is drivingly engaged with a first output shaft 20 and a second output shaft 22 respectively through the first side shaft torque coupling 12 and the second side shaft torque coupling 14. The first output shaft 20 has an inboard end 20A and an outboard end 20B.

The pinion shaft 16 includes a pinion gear 24 mounted thereon that rotates with the pinion shaft 16. The pinion gear 24 is meshed with a ring gear 26 of the rear wheel drive unit 10. The pinion gear 24 has a first set of teeth (not shown) and the ring gear 26 has a second set of teeth (not shown). The two sets of teeth are complimentary to one another and are meshed with one another to provide rotational drive from the pinion gear 24 to the ring gear 26.

The rear wheel drive unit 10 includes the ring gear 26, an intermediate shaft 28, the first side shaft torque coupling 12, and the second side shaft torque coupling 14. The ring gear 26 is drivingly engaged with the intermediate shaft 28; further, it is understood that the ring gear 26 may be integrally formed with the intermediate shaft 28, or it may be secured thereto with a plurality of fasteners. It can be appreciated that the connection of the ring gear 26 and the intermediate shaft 28 results in rotation of the intermediate shaft 28 when the ring gear 26 is driven by the pinion gear 24. The rear wheel drive unit 10 is disposed in a housing (not shown); however, it is understood that the housing used with the rear wheel drive unit 10 may comprise a plurality of housings coupled to one another in any conventional manner.

The intermediate shaft 28 is a rigid elongate member drivingly engaged with the ring gear 26, the first side shaft torque coupling 12, and the second side shaft torque coupling 14. The intermediate shaft 28 is rotatably supported by a pair of bearings 30 disposed in the housing (not shown). A first end 32 of the intermediate shaft 28 is drivingly engaged with the first side shaft torque coupling 12 and a second end 34 of the intermediate shaft 28 is drivingly engaged with the second side shaft torque coupling 14. A central portion 36 of the intermediate shaft 28 is drivingly engaged with the ring gear 26.

The first side shaft torque coupling 12 comprises a clutch drum 38, a clutch can 40, a first plurality of clutch plates 42, a second plurality of clutch plates 44, and a clutch actuator assembly 46. The clutch drum 38 is in driving engagement with the first end 32 of the intermediate shaft 28 and the clutch can 40 is in driving engagement with a distal end 48 of the first output shaft 20.

The clutch actuator assembly 46 may be selectively engaged to facilitate driving engagement between the clutch drum 38 and the clutch can 40 through the first plurality of clutch plates 42 and the second plurality of clutch plates 44.

The clutch drum 38 is a hollow, cylindrically shaped member. The clutch drum 38 is drivingly engaged with the intermediate shaft 28 as described hereinabove. The clutch drum 38 houses the first plurality of clutch plates 42, which are located on an internal surface 50 of the clutch drum 38. The first plurality of clutch plates 42 is secured to the internal surface 50 and do not separate therefrom during operation, but the first plurality of clutch plates 42 is permitted to move axially along the internal surface 50. The first plurality of clutch plates 42 is interleaved with the second plurality of clutch plates 44. Together, the interleaved clutch plates 42, 44 form a clutch pack 52.

The clutch can 40 is a hollow, cylindrically shaped member. The clutch can 40 is drivingly engaged with the distal end 48 of the first output shaft 20 through a plurality of splines, for example. The second plurality of clutch plates 44 is disposed about the clutch can 40, on an external surface 54 of the clutch can 40. The second plurality of clutch plates 44 are secured to the external surface 54 and do not separate therefrom during operation, but the second plurality of clutch plates 44 are permitted to move axially along the external surface 54.

Extending from a first side 51 of a substantially vertical wall portion 53 of the clutch drum 38 and between the clutch can 40 and the first output shaft 20, is a first clutch drum bearing 55 for rotatably supporting the inboard end 20A of the first output shaft 20. More particularly, a bearing mount 55A extends axially outboard from the first side 51 of the substantially vertical wall portion 53 of the clutch drum 38 away from the ring gear 26 for mounting the first clutch drum bearing 55 thereon. In accordance with this embodiment of the disclosure, the first clutch drum bearing 55 is disposed adjacent to and directly radially inboard from the bearing mount 55A. Additionally, in accordance with this embodiment of the disclosure, the first clutch drum bearing 55 is disposed between the bearing mount 55A and the inboard end 20A of the first output shaft 20. According to an alternative embodiment of the disclosure, the bearing mount 55A is integrally formed as part of the first side 51 of the substantially vertical wall portion 53 of the clutch drum 38. The first clutch drum bearing 55 rotationally supports the inboard end 20A of the first output shaft 20.

The clutch actuator assembly 46 is located adjacent the clutch pack 52. The clutch actuator assembly 46 comprises an actuator 56, a gear set 58, and a roller and ramp assembly 60. The actuator 56 is in driving engagement with the gear set 58 and the gear set 58 is in driving engagement with the roller and ramp assembly 60.

The actuator 56 may be such as a reversible electric motor as it is compact and easily controllable. It will be appreciated that any other appropriate type of actuator may be used, such as hydraulic or pneumatic, and these are within the scope of the disclosure.

The actuator 56 drives the gear set 58, which may be a reduction set of gears. In the depicted embodiment, a first gear 62 of the actuator 56 drives a second gear 64 of the gear set 58. The second gear 64 drives a third gear 66 of the gear set 58. The gears 62, 64, 66 achieve a desired torque and speed reduction between the actuator 56 and the third gear 66. Other gear numbers and orientations are possible other than as shown to result in different speeds and torques.

The third gear 66 is in driving engagement with an actuating ring 68 of the roller and ramp assembly 60. More preferably, the actuating ring 68 has a set of teeth (not shown) on an outer radial surface that engages with a plurality of teeth on the third gear 66. The plurality of teeth of the actuating ring 68 is circumferentially extending about the actuating ring 68. The plurality of teeth of the actuating ring 68 may cover a full circumference of the actuating ring 68 or a portion of the circumference. A rotation of the third gear 66 causes the plurality of teeth of the actuating ring 68 to rotate, thus rotating the actuating ring 68.

The roller and ramp assembly 60 also comprises a pressure plate 70 and a plurality of rollers 72. The plurality of rollers 72 are disposed between the pressure plate 70 and the actuating ring 68. Alternatively, a cam disc actuator (not shown), which includes cooperative cam surfaces provided on opposite sides of an actuating ring and a pressure plate, may be used in place of the roller and ramp assembly 60.

The pressure plate 70 resists an axial force generated between the actuating ring 68 and the pressure plate 70, causing the axial force to be applied to an axial thrust bearing 74 in order to load the clutch pack 52. The pressure plate 70 is non-rotatably mounted adjacent the plurality of rollers 72. An annular radial surface 76 of the pressure plate 70, which faces the actuating ring 68 is formed with a set of circumferentially extending grooves (not shown) of varying axial depth. The set of circumferentially extending grooves face complementary grooves (not shown) on an opposite annular surface 78 of the actuating ring 68. A depth of the set of circumferentially extending grooves in the opposite annular surface 78 varies in an opposite circumferential sense from the set of circumferentially extending grooves in the annular radial surface 76. An actuating ring bearing 80, which is an optional component, is mounted adjacent the actuating ring 68. According to an embodiment of the disclosure, the actuating ring bearing 80 is a non-thrust nearing. As illustrated in FIG. 1 of the disclosure, the actuating ring bearing 80 is disposed between the actuating ring 68 and the pressure plate 70 to support relative rotation between the actuating ring 68 and the pressure plate 70. It is understood that the actuating ring bearing 80 may also be a bushing. The actuating ring bearing 80 reacts to a separating force from the actuating ring 68; however, it is understood that alternatively or in addition the separating force may be reacted through the roller and ramp assembly 60.

The plurality of rollers 72 are one of spheres or elongate rollers. A number of rollers 72 correspond to a number of circumferentially extending grooves formed in each of the opposite annular surface 78 and the annular radial surface 76. The plurality of rollers 72 are disposed between the pressure plate 70 and the actuating ring 68, one in each pair of the circumferentially extending grooves.

It can be appreciated that when the actuator 56 moves the actuating ring 68 angularly relative to the pressure plate 70, the actuating ring 68 is driven axially. As a result, the actuating ring 68 variably frictionally loads the clutch pack 52. The axial movement of the actuating ring 68 is transmitted to the clutch pack 52 through the axial thrust bearing 74. As a result, when the actuating ring 68 variably frictionally loads the clutch pack 52, at least a portion of the axial thrust bearing 74 is in direct contact with the first plurality of clutch plates 42 or the second plurality of clutch plates 44 of the clutch pack 52. The axial thrust bearing 74 is provided between the pressure plate 70 and the clutch pack 52 to allow for relative rotation and to reduce the friction there between.

A plurality of wave springs (not shown) may be positioned between each of the second plurality of clutch plates 44 to ensure the plates 44 are equally spaced in order to minimize the viscous drag torque between the clutch plates 42, 44. The wave springs also produce a preload to ensure seating of the axial thrust bearing 74 and the roller and ramp assembly 60. A compression of the clutch plates 42, 44 in response to actuation of the roller and ramp assembly 60 causes the clutch plates 42, 44 to rotate together. A connection of the clutch can 40 to the clutch drum 38 through the clutch pack 52 rotates the first output shaft 20 to provide drive thereto, and thus a connected wheel (not shown) which is in driving engagement with the first output shaft 20.

The second output shaft 22 has an inboard end 22A and an outboard end 22B.

As illustrated in FIG. 1 of the disclosure, at least a portion the outboard end portion 20B of the first output shaft 20 is rotationally supported by a bearing 82. The bearing 82 is located radially inboard from the actuating ring 68 and the actuating ring bearing 80. Additionally, the bearing 82 is located axially outboard from the actuating ring 68 and the actuating ring bearing 80. In accordance with an embodiment of the disclosure, the bearing 82 is disposed adjacent to and radially inboard from an inner surface 84 of an axially extending portion 86 that extends axially outboard from a side 88 of the pressure plate 70 opposite the plurality of rollers 72. Additionally, in accordance with this embodiment of the disclosure, the bearing 82 is disposed between the axially extending portion 86 and the outboard end portion 20B of the first output shaft 20. As a non-limiting example, the axially extending portion 86 is a portion of the housing or the pressure plate 70.

The second side shaft torque coupling 14 is a mirror image of the first side shaft torque coupling 12 and has identical components and layout. The coupling 14 will be describing using the same reference numbers as the coupling 12, but with a prime added to the number.

The second side shaft torque coupling 14 comprises a clutch drum 38', a clutch can 40', a first plurality of clutch plates 42', a second plurality of clutch plates 44', and a clutch actuator assembly 46'. The clutch drum 38' is in driving engagement with the second end 34 of the intermediate shaft 28 and the clutch can 40' is in driving engagement with a distal end 48' of the first output shaft 22. The clutch actuator assembly 46' may be selectively engaged to facilitate driving engagement between the clutch drum 38' and the clutch can 40' through the first plurality of clutch plates 42' and the second plurality of clutch plates 44'.

The clutch drum 38' is a hollow, cylindrically shaped member. The clutch drum 38' is drivingly engaged with the intermediate shaft 28 as described hereinabove. The clutch drum 38' houses the first plurality of clutch plates 42', which are located on an internal surface 50' of the clutch drum 38'. The first plurality of clutch plates 42' is secured to the internal surface 50' and do not separate therefrom during operation, but the first plurality of clutch plates 42' is permitted to move axially along the internal surface 50'. The first plurality of clutch plates 42' is interleaved with the second plurality of clutch plates 44'. Together, the interleaved clutch plates 42', 44' form a clutch pack 52'.

The clutch can 40' is a hollow, cylindrically shaped member. The clutch can 40' is drivingly engaged with the distal end 48' of the second output shaft 22 through a plurality of splines, for example. The second plurality of clutch plates 44' is disposed about the clutch can 40', on an external surface 54' of the clutch can 40'. The second plurality of clutch plates 44' are secured to the external surface 54' and do not separate therefrom during operation, but the second plurality of clutch plates 44' are permitted to move axially along the external surface 54'.

Extending from a first side 51' of a substantially vertical wall portion 53' of the clutch drum 38' and between the clutch can 40' and the second output shaft 22, is a second clutch drum bearing 55' for rotatably supporting the inboard end 22A of the second output shaft 22. More particularly, a bearing mount 55A' extends axially outboard from the first side 51' of the substantially vertical wall portion 53' of the clutch drum 38' away from the ring gear 26 for mounting the second clutch drum bearing 55' thereon. In accordance with this embodiment of the disclosure, the second clutch drum bearing 55' is disposed adjacent to and directly radially inboard from the bearing mount 55A'. Additionally, in accordance with this embodiment of the disclosure, the second clutch drum bearing 55' is disposed between the bearing mount 55A' and the inboard end 22A of the second output shaft 22. According to an alternative embodiment of the disclosure, the bearing mount 55A' is integrally formed as part of the first side 51' of the substantially vertical wall portion 53' of the clutch drum 38'. The second clutch drum bearing 55' rotationally supports the inboard end 22A of the second output shaft 22.

The clutch actuator assembly 46' is located adjacent the clutch pack 52'. The clutch actuator assembly 46' comprises an actuator 56', a gear set 58', and a roller and ramp assembly 60'. The actuator 56' is in driving engagement with the gear set 58' and the gear set 58' is in driving engagement with the roller and ramp assembly 60'.

The actuator 56' may be such as a reversible electric motor as it is compact and easily controllable. It will be appreciated that any other appropriate type of actuator may be used, such as hydraulic or pneumatic, and these are within the scope of the disclosure.

The actuator 56' drives the gear set 58', which may be a reduction set of gears. In the depicted embodiment, a first gear 62' of the actuator 56' drives a second gear 64' of the gear set 58'. The second gear 64' drives a third gear 66' of the gear set 58'. The gears 62', 64', 66' achieve a desired torque and speed reduction between the actuator 56' and the third gear 66'. Other gear numbers and orientations are possible other than as shown to result in different speeds and torques.

The third gear 66' is in driving engagement with an actuating ring 68' of the roller and ramp assembly 60'. More preferably, the actuating ring 68' has a set of teeth (not shown) on an outer radial surface that engages with a plurality of teeth on the third gear 66'. The plurality of teeth of the actuating ring 68' is circumferentially extending about the actuating ring 68'. The plurality of teeth of the actuating ring 68' may cover a full circumference of the actuating ring 68' or a portion of the circumference. A rotation of the third gear 66' causes the plurality of teeth of the actuating ring 68' to rotate, thus rotating the actuating ring 68'.

The roller and ramp assembly 60' also comprises a pressure plate 70' and a plurality of rollers 72'. The plurality of rollers 72' are disposed between the pressure plate 70' and the actuating ring 68'. Alternatively, a cam disc actuator (not shown), which includes cooperative cam surfaces provided on opposite sides of an actuating ring and a pressure plate, may be used in place of the roller and ramp assembly 60'.

The pressure plate 70' resists an axial force generated between the actuating ring 68' and the pressure plate 70', causing the axial force to be applied to an axial thrust bearing 74' in order to load the clutch pack 52'. The pressure plate 70' is non-rotatably mounted adjacent the plurality of rollers 72'. An annular radial surface 76' of the pressure plate 70', which faces the actuating ring 68' is formed with a set of circumferentially extending grooves (not shown) of varying axial depth. The set of circumferentially extending grooves face complementary grooves (not shown) on an opposite annular surface 78' of the actuating ring 68'. A depth of the set of circumferentially extending grooves in the opposite annular surface 78' varies in an opposite circumferential sense from the set of circumferentially extending grooves in the annular radial surface 76'. An actuating ring bearing 80', which is an optional component, is mounted adjacent the actuating ring 68'. According to an embodiment of the disclosure, the actuating ring bearing 80' is a non-thrust nearing. As illustrated in FIG. 1 of the disclosure, the actuating ring bearing 80' is disposed between the actuating ring 68' and the pressure plate 70' to support relative rotation between the actuating ring 68' and the pressure plate 70'. It is understood that the actuating ring bearing 80' may also be a bushing. The actuating ring bearing 80' reacts to a separating force from the actuating ring 68'; however, it is understood that alternatively or in addition the separating force may be reacted through the roller and ramp assembly 60'.

The plurality of rollers 72' are one of spheres or elongate rollers. A number of rollers 72' correspond to a number of circumferentially extending grooves formed in each of the opposite annular surface 78' and the annular radial surface 76'. The plurality of rollers 72' are disposed between the pressure plate 70' and the actuating ring 68', one in each pair of the circumferentially extending grooves.

It can be appreciated that when the actuator 56' moves the actuating ring 68' angularly relative to the pressure plate 70', the actuating ring 68' is driven axially. As a result, the actuating ring 68' variably frictionally loads the clutch pack 52'. The axial movement of the actuating ring 68' is transmitted to the clutch pack 52' through the axial thrust bearing 74'. As a result, when the actuating ring 68' variably frictionally loads the clutch pack 52', at least a portion of the axial thrust bearing 74' is in direct contact with the first plurality of clutch plates 42' or the second plurality of clutch plates 44' of the clutch pack 52'. The axial thrust bearing 74' is provided between the pressure plate 70' and the clutch pack 52' to allow for relative rotation and to reduce the friction there between.

As illustrated in FIG. 1 of the disclosure, at least a portion the outboard end portion 22B of the second output shaft 22 is rotationally supported by a bearing 82'. The bearing 82' is located radially inboard from the actuating ring 68' and the actuating ring bearing 80'. Additionally, the bearing 82' is located axially outboard from the actuating ring 68' and the actuating ring bearing 80'. In accordance with an embodiment of the disclosure, the bearing 82' is disposed adjacent to and radially inboard from an inner surface 84' of an axially extending portion 86' that extends axially outboard from a side 88' of the pressure plate 70' opposite the plurality of rollers 72'. Additionally, in accordance with this embodiment of the disclosure, the bearing 82' is disposed between the axially extending portion 86' and the outboard end portion 22B of the second output shaft 22. As a non-limiting example, the axially extending portion 86' is a portion of the housing or the pressure plate 70'.

A plurality of wave springs (not shown) may be positioned between each of the second plurality of clutch plates 44' to ensure the plates 44' are equally spaced in order to minimize the viscous drag torque between the clutch plates 42', 44'. The wave springs also produce a preload to ensure seating of the axial thrust bearing 74' and the roller and ramp assembly 60'. A compression of the clutch plates 42', 44' in response to actuation of the roller and ramp assembly 60' causes the clutch plates 42', 44' to rotate together. A connection of the clutch can 40' to the clutch drum 38' through the clutch pack 52' rotates the second output shaft 22 to provide drive thereto, and thus a connected wheel (not shown) which is in driving engagement with the second output shaft 22.

In use, the first side shaft torque coupling 12 and the second side shaft torque coupling 14 of the rear wheel drive unit 10 may be selectively disengaged to increase an efficiency of a driveline (not shown) of a vehicle (not shown) the rear wheel drive unit 10 is incorporated in. The clutch actuator assemblies 46, 46', and thus the first side shaft torque coupling 12 and the second side shaft torque coupling 14, are controlled by an electronic control unit (not shown). The control is carried out by judging vehicle running conditions according to at least one vehicle parameter, including but not limited to, wheel speeds. The rear wheel drive unit 10 is thus provided with a disconnect function, which allows the clutch drums 38, 38', the intermediate shaft 28 and ring gear 26, and the pinion shaft 16 to be placed in an idle condition. In the idle condition, the clutch drums 38, 38', the intermediate shaft 28 and ring gear 26, and the pinion shaft 16 are drivingly disengaged from a remaining portion of the driveline of the vehicle.

Further, the first side shaft torque coupling 12 and the second side shaft torque coupling 14 of the rear wheel drive unit 10 may be selectively engaged to provide additional traction to a driveline (not shown) of a vehicle (not shown) the rear wheel drive unit 10 is incorporated in. The clutch actuator assemblies 46, 46', and thus the first side shaft torque coupling 12 and the second side shaft torque coupling 14, are controlled by the electronic control unit. The control is carried out by judging vehicle running conditions according to at least one vehicle parameter, including but not limited to, wheel speeds. The rear wheel drive unit 10 thus provides increased traction to the vehicle when at least one of the first side shaft torque coupling 12 and the second side shaft torque coupling 14 are engaged. The clutch drums 38, 38', the intermediate shaft 28 and ring gear 26, and the pinion shaft 16 are placed in a drive condition through actuation of the first side shaft torque coupling 12 and the second side shaft torque coupling 14.

When the clutch actuator assemblies 46, 46' are engaged, the rear wheel drive unit 10 may be used to reduce a slipping of at least one of the connected wheels during operation of the vehicle, by placing at least one of the clutch actuator assemblies 46, 46' in a slipping condition. The rear wheel drive unit 10 may also be engaged during a vehicle acceleration operation to damp the vehicle against undesirable yaw disturbances. Still yet, the rear wheel drive unit 10 may also be engaged during a vehicle corning operation to transfer torque to a wheel assembly having an inner position to correct for an undesirable over steer condition.

In accordance with the provisions of the patent statutes, the present invention has been described in what is considered to represent its preferred embodiments, however, it should be noted that the invention can be practiced otherwise than as specifically illustrated and described without departing from its scope or spirit.

What is claimed is:

1. A drive unit with twin side shaft torque coupling, comprising: a pinion shaft with a pinion gear; a ring gear meshed with said pinion gear;
    an intermediate shaft having a first end portion and a second end portion and a central portion bounded by said first end portion and said second end portion;
    wherein said ring gear is drivingly connected to said central portion of said intermediate shaft;
    a first clutch drum is drivingly connected to said first end portion of said intermediate shaft;
    wherein said first clutch drum supporting selective axial movement of a first plurality of clutch plates on an internal surface of said first clutch drum; a bearing mount extends axially outboard from a first side of a substantially vertical wall portion of said first clutch drum away from said ring gear;
    wherein said bearing mount is integrally formed as part of said substantially vertical wall portion of said first clutch drum; a first clutch can is located radially inboard from said first clutch drum, wherein said first clutch can supporting selective axial movement of a second plurality of clutch plates on an external surface of said first clutch can;
    wherein said first plurality of clutch plates of said first clutch drum are interleaved with said second plurality of clutch plates of said first clutch can to form a first clutch pack;
    wherein at least a portion of said first clutch can is disposed radially outboard from at least a portion of said bearing mount of said first clutch drum;
    wherein said first clutch can is drivingly connected to one end portion of a first output shaft located radially inboard from said first clutch can; a first clutch drum bearing located radially inboard from said first clutch can and said bearing mount of said first clutch drum;
    wherein at least a portion of said first clutch drum bearing is in direct contact with at least a portion of said first output shaft and at least a portion of said bearing mount of said first clutch drum;
    wherein said first clutch drum bearing rotationally supports said inboard end of said first output shaft;
    a first clutch actuator assembly wherein said first clutch actuator assembly is selectively engagable to drivingly connect said first clutch drum to said first clutch can of said first clutch pack;
    a second clutch drum drivingly connected to said second end portion of said intermediate shaft; wherein said second clutch drum supporting selective axial movement of a first plurality of clutch plates on an internal surface of said second clutch drum; a bearing mount extends axially outboard from a first side of a substantially vertical wall portion of said second clutch drum away from said ring gear;
    wherein said bearing mount is integrally formed as part of said substantially vertical wall portion of said second clutch drum;
    a second clutch can located radially inboard from said second clutch drum;
    wherein said second clutch can supporting selective axial movement of a second plurality of clutch plates on an external surface of said second clutch can;
    wherein said first plurality of clutch plates of said second clutch drum are interleaved with said second plurality of clutch plates of said second clutch can to form a second clutch pack;
    wherein at least a portion of said second clutch can is disposed radially outboard from at least a portion of said bearing mount of said second clutch drum;
    wherein said second clutch can is directly connected to one end portion of a second output shaft located radially inboard from said second clutch can;
    a second clutch drum bearing located radially inboard from said second clutch can and said bearing mount of said second clutch drum;
    wherein at least a portion of said second clutch drum bearing is in direct contact with at least a portion of said second output shaft and at least a portion of said bearing mount of said second clutch drum;
    wherein said second clutch drum bearing rotationally supports said inboard end of said second output shaft;
    a second clutch actuator assembly wherein said second clutch actuator assembly is selectively engagable to drivingly connect said second clutch drum to said second clutch can of said second clutch pack.

2. The drive unit of claim 1, wherein said first end portion and said second end portion of said intermediate shaft are mounted for rotation on at least two bearings axially inboard of said first clutch drum and second clutch drum.

3. The drive unit of claim 1, wherein said ring gear is not attached to a differential comprising side gears, differential pinion gears or a differential case.

4. A drive unit with twin side shaft torque coupling, comprising: a pinion shaft with a pinion gear; a ring gear meshed with said pinion gear;
    an intermediate shaft having a first end portion and a second end portion and a central portion bounded by said first end portion and said second end portion;
    wherein said ring gear is integrally formed as part of said central portion of said intermediate shaft;
    a first clutch drum is drivingly connected to said first end portion of said intermediate shaft;
    wherein said first clutch drum supporting selective axial movement of a first plurality of clutch plates on an internal surface of said first clutch drum; a bearing mount extends axially outboard from a first side of a substantially vertical wall portion of said first clutch drum away from said ring gear;
    wherein said bearing mount is integrally formed as part of said substantially vertical wall portion of said first clutch drum; a first clutch can is located radially inboard from said first clutch drum, wherein said first clutch can supporting selective axial movement of a second plurality of clutch plates on an external surface of said first clutch can;

wherein said first plurality of clutch plates of said first clutch drum are interleaved with said second plurality of clutch plates of said first clutch can to form a first clutch pack;

wherein at least a portion of said first clutch can is disposed radially outboard from at least a portion of said bearing mount of said first clutch drum;

wherein said first clutch can is directly connected to one end portion of a first output shaft located radially inboard from said first clutch can; a first clutch drum bearing located radially inboard from said first clutch can and said bearing mount of said first clutch drum;

wherein at least a portion of said first clutch drum bearing is in direct contact with at least a portion of said first output shaft and at least a portion of said bearing mount of said first clutch drum;

wherein said first clutch drum bearing rotationally supports said inboard end of said first output shaft;

a first clutch actuator assembly wherein said second clutch actuator assembly is selectively engagable to drivingly connect said first clutch drum to said first clutch can of said first clutch pack;

a second clutch drum drivingly connected to said second end portion of said intermediate shaft;

wherein said second clutch drum supporting selective axial movement of a first plurality of clutch plates on an internal surface of said second clutch drum; a bearing mount extends axially outboard from a first side of a substantially vertical wall portion of said second clutch drum away from said ring gear;

wherein said bearing mount is integrally formed as part of said substantially vertical wall portion of said second clutch drum; a second clutch can located radially inboard of said second clutch drum;

wherein said second clutch can supporting selective axial movement of a second plurality of clutch plates on an external surface of said second clutch can;

wherein said first plurality of clutch plates of said second clutch drum are interleaved with said second plurality of clutch plates of said second clutch can to form a second clutch pack;

wherein at least a portion of said second clutch can is disposed radially outboard from at least a portion of said bearing mount of said second clutch drum;

wherein said second clutch can is directly connected to one end portion of a second output shaft located radially inboard from said second clutch can;

a second clutch drum bearing located radially inboard from said second clutch can and said bearing mount of said second clutch drum;

wherein at least a portion of said second clutch drum bearing is in direct contact with at least a portion of said second output shaft and at least a portion of said bearing mount of said second clutch drum;

wherein said second clutch drum bearing rotationally supports said inboard end of said second output shaft;

a second clutch actuator assembly wherein said second clutch actuator assembly is selectively engagable to drivingly connect said second clutch drum to said second clutch can of said second clutch pack.

5. The drive unit of claim 4, wherein said first end portion and said second end portion of said intermediate shaft are mounted for rotation on at least two bearings axially inboard of said first clutch drum and second clutch drum.

6. The drive unit of claim 4, wherein said first clutch actuator assembly comprises an actuator, a gear set driven by said actuator;

wherein said gear set connected to a single rotatable actuator ring of a ball and ramp assembly;

wherein at least one roller is located between said single rotatable actuator ring and a fixed non-rotatable pressure plate;

wherein a thrust bearing is located between said single rotatable actuator ring and said first clutch pack;

wherein in response to a rotation of a portion of said clutch actuator assembly said thrust bearing is driven in an axial manner by said rotatable actuating ring into direct contact with said first clutch pack, causing said first plurality of clutch plates of said first clutch pack to be at least variably frictionally engaged with said second plurality of clutch plates of said first clutch pack;

wherein said second clutch actuator assembly comprises an actuator, a gear set driven by said actuator;

wherein said gear set connected to a single rotatable actuator ring of a ball and ramp assembly;

wherein at least one roller is located between said single rotatable actuator ring and a fixed non-rotatable pressure plate;

wherein a thrust bearing is located between said single rotatable actuator ring and said second clutch pack; and wherein in response to a rotation of a portion of said second clutch actuator assembly said thrust bearing is driven in an axial manner by said rotatable actuating ring into direct contact with said second clutch pack, causing said first plurality of clutch plates of said second clutch pack to be at least variably frictionally engaged with said second plurality of clutch plates of said second clutch pack.

7. The drive unit of claim 4, wherein said ring gear is not attached to a differential comprising side gears, differential pinion gears or a differential case.

8. The drive unit of claim 6, wherein said fixed non-rotatable pressure plate of said first clutch actuator assembly further comprises an axially extending portion;

wherein said axially extending portion extends axially outboard from a side of said fixed non-rotatable pressure plate of said first clutch actuator assembly opposite said at least one roller;

a bearing is disposed adjacent to and radially inboard from an inner surface of said axially extending portion of said fixed non-rotatable pressure plate of said first clutch actuator assembly and between said axially extending portion and said first output shaft;

wherein said bearing rotationally supports an outboard end portion of said first output shaft;

wherein said fixed non-rotatable pressure plate of said second clutch actuator assembly further comprises an axially extending portion;

wherein said axially extending portion extends axially outboard from a side of said fixed non-rotatable pressure plate of said second clutch actuator assembly opposite said at least one roller;

a bearing is disposed adjacent to and radially inboard from an inner surface of said axially extending portion of said fixed non-rotatable pressure plate of said second clutch actuator assembly and between said axially extending portion and said second output shaft; and wherein said bearing rotationally supports an outboard end portion of said second output shaft.

9. The drive unit of claim 6, wherein said first clutch drum, said first clutch can and said first clutch actuator assembly are symmetrical with said second clutch drum, said second clutch can and said second clutch actuator assembly.

10. A method of coupling torque through twin side shafts of a drive unit, comprising:
providing a drive unit comprising a pinion shaft with a pinion gear, a ring gear, an intermediate shaft, a first clutch drum, a second clutch drum, a first clutch drum bearing, a second clutch drum bearing, a first clutch can, a second clutch can, a first clutch actuator assembly, a second clutch actuator assembly, a first output shaft and a second output shaft;
wherein said clutch drums are mounted for rotation with end portions of said intermediate shaft, wherein each of said clutch drums supporting selective axial movement of a first plurality of clutch plates on an internal surface of each of said clutch drums, wherein a bearing mount extends axially outboard from a first side of a substantially vertical wall portion of said clutch drums away from said ring gear, wherein said bearing mount is integrally formed as part of said substantially vertical wall portion of said clutch drums;
wherein said clutch cans are located radially inboard from said clutch drums, wherein each of said clutch cans supporting selective axial movement of a second plurality of clutch plates on an external surface of each of said clutch cans, wherein said first plurality of clutch plates are interleaved with said second plurality of clutch plates to form clutch packs, wherein at least a portion of said clutch cans are disposed radially outboard from at least a portion of said bearing mounts of said clutch drums, wherein said clutch cans are drivingly connected to end portions of said output shafts located radially inboard from said clutch cans;
wherein said clutch drum bearings are located radially inboard from said clutch cans and said bearing mounts of said clutch drums, wherein at least a portion of said clutch drum bearings are in direct contact with at least a portion of said output shafts and at least a portion of bearing mounts of said clutch drums;
wherein said clutch actuator assemblies are selectively engagable to drivingly connect said clutch drums to said clutch cans;
providing an idle mode for said drive unit, wherein said pinion shaft with said pinion gear, said ring gear, said intermediate shaft, said first clutch drum and said second clutch drum are disconnected from said first output shaft and said second output shaft;
providing an engaged mode wherein said pinion shaft with said pinion gear, said ring gear, said intermediate shaft, said first clutch drum, said second clutch drum, said first clutch can, said second clutch can, said first clutch actuator assembly and said second clutch actuator assembly provide drive to said first output shaft and/or said second output shaft.

11. The method of claim 10, wherein said first clutch drum, said second clutch drum, said first clutch can, said second clutch can and said first clutch actuator assembly and said second clutch actuator assembly makes up said rear drive of a vehicle.

12. The method of claim 10, wherein said ring gear is integrally formed as part of a central portion of said intermediate shaft.

13. The drive unit of claim 1, wherein said first clutch actuator assembly comprises an actuator, a gear set driven by said actuator;
wherein said gear set connected to a single rotatable actuator ring of a ball and ramp assembly;
wherein at least one roller is located between said single rotatable actuator ring and a fixed non-rotatable pressure plate;
wherein a thrust bearing is located between said single rotatable actuator ring and said first clutch pack;
wherein in response to a rotation of a portion of said clutch actuator assembly said thrust bearing is driven in an axial manner by said rotatable actuating ring into direct contact with said first clutch pack, causing said first plurality of clutch plates of said first clutch pack to be at least variably frictionally engaged with said second plurality of clutch plates of said first clutch pack;
wherein said second clutch actuator assembly comprises an actuator, a gear set driven by said actuator;
wherein said gear set connected to a single rotatable actuator ring of a ball and ramp assembly;
wherein at least one roller is located between said single rotatable actuator ring and a fixed non-rotatable pressure plate;
wherein a thrust bearing is located between said single rotatable actuator ring and said second clutch pack; and
wherein in response to a rotation of a portion of said second clutch actuator assembly said thrust bearing is driven in an axial manner by said rotatable actuating ring into direct contact with said second clutch pack, causing said first plurality of clutch plates of said second clutch pack to be at least variably frictionally engaged with said second plurality of clutch plates of said second clutch pack.

14. The drive unit of claim 10, wherein said clutch actuator assemblies each comprise actuators, and gear sets driven by said actuators, wherein said gear sets are drivingly connected to a single rotatable actuator ring of ball and ramp assemblies, wherein at least one roller is located between said single rotatable actuator rings and fixed non-rotatable pressure plates, and wherein thrust bearings are located between said single rotatable actuator rings and said clutch packs.

15. The drive unit of claim 13, wherein said fixed non-rotatable pressure plate of said first clutch actuator assembly further comprises an axially extending portion;
wherein said axially extending portion extends axially outboard from a side of said fixed non-rotatable pressure plate of said first clutch actuator assembly opposite said at least one roller;
a bearing is disposed adjacent to and radially inboard from an inner surface of said axially extending portion of said fixed non-rotatable pressure plate of said first clutch actuator assembly and between said axially extending portion and said first output shaft;
wherein said bearing rotationally supports an outboard end portion of said first output shaft;
wherein said fixed non-rotatable pressure plate of said second clutch actuator assembly further comprises an axially extending portion;
wherein said axially extending portion extends axially outboard from a side of said fixed non-rotatable pressure plate of said second clutch actuator assembly opposite said at least one roller;
a bearing is disposed adjacent to and radially inboard from an inner surface of said axially extending portion of said fixed non-rotatable pressure plate of said second clutch actuator assembly and between said axially extending portion and said second output shaft; and wherein said bearing rotationally supports an outboard end portion of said second output shaft.

16. The drive unit of claim 13, wherein said first clutch drum, said first clutch can and said first clutch actuator assembly are symmetrical with said second clutch drum, said second clutch can and said second clutch actuator assembly.

\* \* \* \* \*

UNITED STATES PATENT AND TRADEMARK OFFICE
CERTIFICATE OF CORRECTION

PATENT NO. : 10,408,323 B2
APPLICATION NO. : 15/326380
DATED : September 10, 2019
INVENTOR(S) : Kenneth E. Cooper Page 1 of 1

It is certified that error appears in the above-identified patent and that said Letters Patent is hereby corrected as shown below:

In the Claims

Claim 4: replace the word "directly" at Column 11, Line 8 with the word "drivingly".

Claim 4: replace the word "directly" at Column 11, Line 45 with the word "drivingly".

Signed and Sealed this
Third Day of December, 2019

Andrei Iancu
*Director of the United States Patent and Trademark Office*